United States Patent
McClellan

[11] Patent Number: 5,220,743
[45] Date of Patent: Jun. 22, 1993

[54] FISH LURE

[76] Inventor: Bingham A. McClellan, 54 Forest La., Eustice, Fla. 32726

[21] Appl. No.: 929,371

[22] Filed: Aug. 14, 1992

Related U.S. Application Data

[63] Continuation-in-part of Ser. No. 808,589, Dec. 17, 1991.

[51] Int. Cl.$^5$ .............................................. A01K 83/01
[52] U.S. Cl. .................................. 43/44.81; 43/42.38; 43/42.37
[58] Field of Search ............... 43/42.37, 42.4, 43.4, 43/43.6, 43.13, 43.16, 44.81, 42.39, 42.38

[56] References Cited

U.S. PATENT DOCUMENTS

| | | | |
|---|---|---|---|
| 742,093 | 10/1903 | Henderson | 43/43.6 |
| 756,009 | 3/1904 | Flegle | 43/44.81 |
| 852,793 | 5/1907 | Ladish | 43/43.6 |
| 973,479 | 10/1910 | Cooper | 43/43.4 |
| 1,582,171 | 4/1926 | Foss | 43/42.39 |
| 1,654,830 | 1/1928 | Pflueger | 43/42.37 |
| 4,334,381 | 6/1982 | Carver | 43/44.81 |

FOREIGN PATENT DOCUMENTS 0021813 of 1896 United Kingdom ............... 43/42.39

Primary Examiner—Mark Rosenbaum
Assistant Examiner—James Miner
Attorney, Agent, or Firm—Charles M. Kaplan

[57] ABSTRACT

Fishing tackle includes a backweighted fish hook that is intended for attachment to a soft bodied fishing lure. Specific locations on the hook shank where sinker means can be attached are disclosed. Sinker means on a fish hook can be shaped so as to cause plastic lures to have strike inducing action.

21 Claims, 1 Drawing Sheet

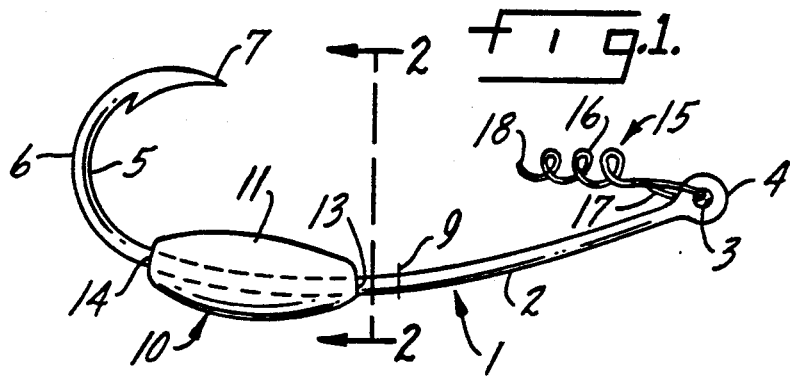
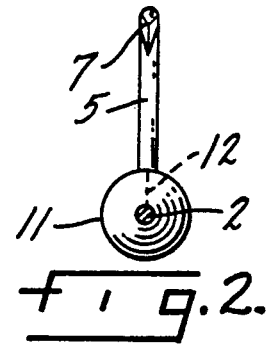
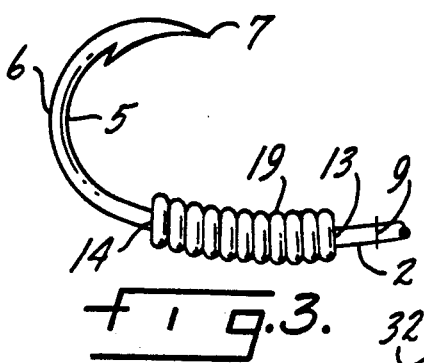
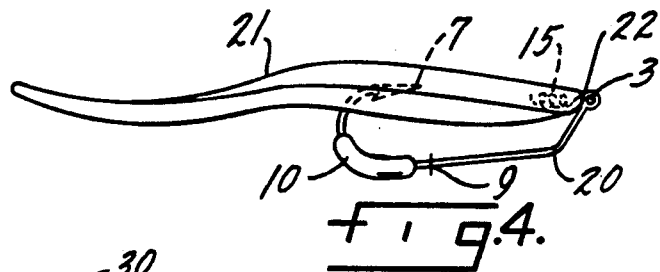
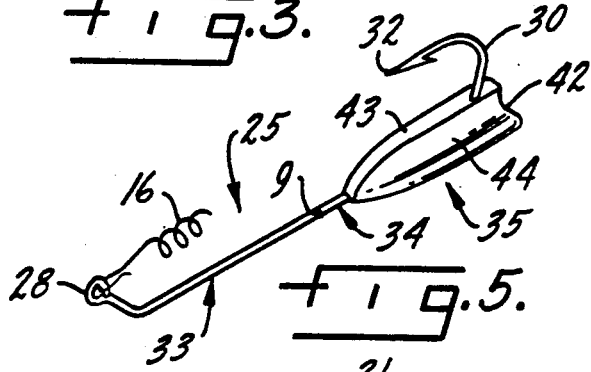
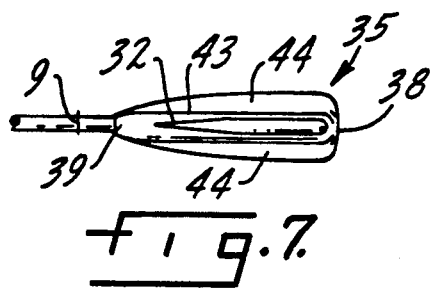
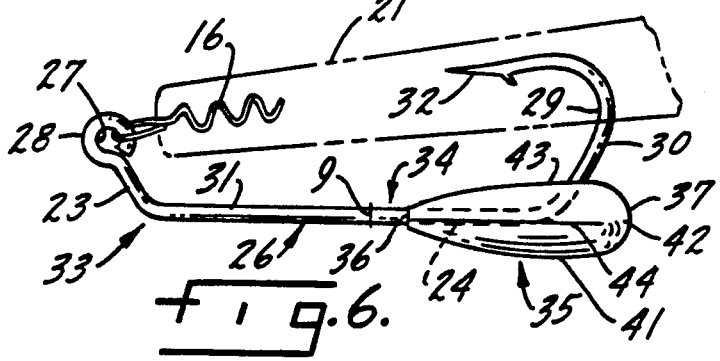
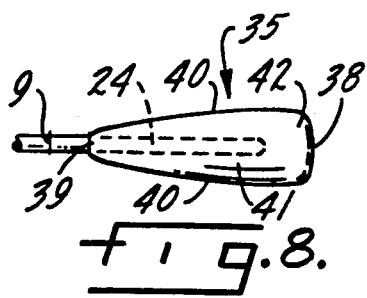
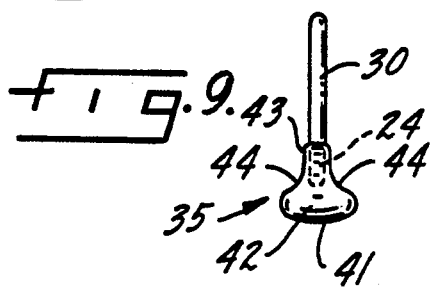

FISH LURE

RELATED INVENTION

This application is a continuation-in-part of U.S. application for letters patent Ser. No. 07/808,589 filed Dec. 17, 1991, now abandoned.

BACKGROUND OF THE INVENTION

This invention relates to soft bodied fish lures such as plastic worms, eels, slugs and the like, and more particularly to improved ways of rigging such lures on a fish hook. Soft bodied lures are fished as top water lures or for very shallow fishing when no sinker is placed on the line ahead of the lure. When a sinker is placed on the line ahead of a soft bodied lure, the lure nosedives directly to the bottom of the water being fished; the fisherman then bounces the soft bodied lure along the bottom until it is near him and then he reels in the lure. The prior art riggings which confined the use of soft bodied lures to fishing the surface or very shallow water or to fishing the bottom prevented the use of such lures for catching fish suspended between the top and the bottom of a body of water. An unweighted soft bodied lure will not sink or stay at the level of the suspended fish, and a front-end weighted soft bodied lure nosedives past suspended fish in such an unnatural manner that the fish almost never strike the lure as it plummets to the bottom. This wastes the fisherman's time because fish are almost never caught during the interval while the front-end weighted lure falls to the bottom. In addition, soft bodied lures rigged according to the prior art pick up strands of floating grass or weeds and this ruins the retrieve.

OBJECTIVES OF THE INVENTION

Accordingly, it is an object of this invention to provide improved fishing lures and rigging.

Another object is to provide a back-weighted fish hook that causes strike producing action when it is used with soft bodied fish lures.

An additional object is to provide soft bodied lures with a strike provoking, slow, trembling or wobbling swimming-like action as the lure falls downwardly through the water at a horizontal attitude before it is retrieved Another object is to move the center of balance of a fish hook as far back from the hook eye as is practical.

A further object is to provide a fish hook with a triangular weight having a wide lowermost surface that ensures that the rig will land and stand upright on the bottom of the water being fished, and as the rig is retrieved.

Another object is to enable soft bodied lures to be used easily and effectively to catch suspended fish.

A further object is to keep at least half of the weight of a back-weighted fish hook below the hook shank.

Another object is to provide a back-weighted fish hook for soft bodied lures that produces sufficient action to catch suspended fish merely by twitching the rod tip as the lure is retrieved.

A further object is to slow the rate of descent of a weighted plastic lure as it falls through the water.

Another object is to provide an improved weedless rigging for soft bodied fish lures.

Another object is to permit soft bodied fish lures to be used below the water surface without requiring that sinkers be added to the rigging ahead of the lures.

Another object is to cause a lure impailed on a back-weighted hook to have fish strike triggering action by making the front end of the hook unstable.

An additional object is to promote longer and more accurate casts with soft bodied fishing lures.

Another object is to cause a fish lure to have a more natural appearance because it descends through the water in essentially a horizontal plane.

A further object is to make it easier for unskilled fishermen to use soft plastic baits.

Another object is to rig a fish lure on a jig type fish hook in a manner which causes the hook shank to act as a prow and keel that diminishes snagging of the lure by floating grass or weeds.

A further object is to provide fish hooks and lures which can be effectively fished by unskilled fishermen at a variety of depths and are durable, easy to rig, inexpensive, essentially snag-free, and which do not possess defects found in similar prior art fishing tackle.

Other objects and advantages of the invention will be found in the specification and claims, and the scope of the invention will be set forth in the claims.

DESCRIPTION OF THE DRAWING

FIG. 1 is a side view of an embodiment of the invention.

FIG. 2 is a cross sectional view taken along the line 2—2 in FIG. 1.

FIG. 3 is a partial side view of another embodiment of the invention.

FIG. 4 is a perspective view of another embodiment of the invention.

FIG. 5 is a perspective view of another embodiment of the invention.

FIG. 6 is a side view of the embodiment of FIG. 5.

FIG. 7 is a partial top plan view of a the embodiment of FIG. 5.

FIG. 8 is a partial bottom plan view of the embodiment of FIG. 5.

FIG. 9 is a rear end view of the embodiment of FIG. 5.

DESCRIPTION OF THE INVENTION

The drawing shows a back weighted fish hook 1 having a shank 2 with an eye 3 at a shank front end 4 and a reverse bend 5 at shank second end 6. Bend 5 terminates in a barbed hook point 7. Hook 1 has a center of balance 9 on its shank 2. The center of balance 9 of a hook is defined as the location or point on the shank of the hook upon which the bare hook can be balanced. In other words, if the bare hook 1 were rested on a knife edge that is located at 9, the hook would balance on the knife edge. The bare hook 1 that balances at 9 would not have sinker means 10, lure attaching means 15, or any other rigging connected to it. The center of gravity of hook 1 will be at or near the center of balance.

Sinker means 10 is secured to shank 2 between the center of balance 9 and the hook second end 6. As illustrated in FIG. 1, sinker means 10 is a lead body 11 which has been immovably molded around shank 2. Body 11 also may be a split sinker that has been wrapped around shank 2 and crimped, as indicated by the phantom line at 12 in FIG. 2. Body 11 has a sinker means first terminal end 13 that faces the eye 3. For this invention to achieve its objectives, end 13 must be located between the center of balance 9 and the end 6 of the hook. Locating sinker means 10 on the bend side of the center of balance 9 shifts the center of gravity of hook 1 toward the back of the hook and establishes a new center of balance that is closer to end 6 of the hook than was the center of balance 9 of the bare hook. The point 7 of hook 1 must overlap sinker means 10. In other words, point 7 extends beyond sinker means second terminal end 14 of body 11 in the direction toward eye 3. Sinker means 10 must be located entirely beneath the lure body when hook 1 is attached to a soft bodied lure.

Hook 1 may also be provided with connector means 15 for attaching a soft bodied fish lure to the hook. Preferably, connector means 15 is a helical wire coil 16 having a wire coil first end 17 that can be pivotally secured to the hook by passing end 17 through eye 3 and bending end 17 around the eye. The wire coil second or sharp end 18 of coil 16 is a wire point that can be threaded or screwed into a first end of a soft bodied fish lure in conventional manner.

FIG. 3 shows another embodiment of the invention that is identical in every way to the embodiment of FIGS. 1 and 2, except that sinker means 10 is a continuous strand 19 of lead that has been wound or wrapped around hook shank 2 and is immovable on shank 2.

To properly back-weight hook 1 in accord with this invention, sinker means 10 should weigh about one half to four times the weight of bare hook 1, and preferably sinker means 10 weighs from about three quarters to three times the weight of bare hook 1. It has been found that if sinker means 10 weighs appreciably less than about one half the weight of bare hook 1, then the lure will not be back-weighted sufficiently. But, if sinker means 10 weighs appreciably more than about four times the weight of bare hook 1, the additional weight will significantly impair the action of the lure to which it is attached. For example, a 5/0 Wright & McGill 60 degree bend jig hook (part No. 95JB) weighed 2.09 grams when bare. That hook was wrapped with 1.70 grams of a lead strand 19, as shown in FIG. 3, and achieved objectives of this invention when used with a jerk bait that was rigged as shown in FIG. 4. The added weight of the sinker means 10 was about 0.8 times the weight of the bare 5/0 hook. Another example that achieved objectives of this invention was a 4/0 Wright & McGill No. 95JB hook that weighed 1.58 grams when bare, and was wrapped with 2.06 grams of lead strand 19 and used with a jerk bait that was rigged as shown in FIG. 4. The added weight of the sinker 10 was about 1.3 times the weight of the bare 4/0 hook.

FIG. 4 shows an embodiment of the invention in which the back weighted hook is a 60 degree bend jig hook 20 with sinker means 10 properly located behind center of balance 9. The point 7 of hook 20 is within the soft plastic body of an eel-like jerk bait 21 and point 7 overlaps sinker means 10. The sharp end of coil 15 has been screwed into the end 22 of the lure and holds the lure end next to the eye 3 of the hook.

FIGS. 5–9 show another embodiment of a back weighted fish hook that is intended to be rigged with a soft bodied fish lure 21 (shown in broken lines) in the same manner shown in FIG. 4, with the weight or sinker located entirely below the lure body. Preferably, hook 25 is a Wright & McGill model 410 60 degree jig hook. Hook 25 has a shank 26 with an eye 27 at a shank first end 28 and a reverse bend 29 at a shank second end 30. A central or straight portion 31 of shank 26 connects ends 28 and 30 and bend 29 terminates in a hook point 32. The center of balance 9 of the hook should be determined in the manner previously described and is located on straight portion 31. Center of balance 9 divides hook 25 into a front portion 33 that includes first end 28 and a rear portion 34 that includes second end 30. Front portion 33 includes a short shank segment 23 that extends at an acute angle of 60 degrees to straight portion 31. Connector means for attaching a soft lure body, such as helical wire coil 16 as described above, is pivotally attached to eye 27.

Sinker means 35 is immovably molded on shank 26 to the rear of or behind center of balance 9 and has a sinker means first terminal end 36 facing eye 27 and a sinker means second terminal end 37 adjacent end 30. Sinker means 35 is located entirely on the rear portion 34 behind center of balance 9 with its end 36 being adjacent the center of balance, and no part of the sinker means extends past the center of balance toward front end 28. The point 32 of the hook overlaps sinker means 35. When viewed in plan, as shown in FIGS. 7 and 8, sinker means 35 is shaped generally like an elongated isosceles triangle having its unequal side 38 adjacent end 30 and the vertex 39 of its equal sides 40 adjacent center of balance 9. The sides 38 and 40 are curved. Side 38 should be substantially shorter than the equal sides 40. When viewed transversely to shank 26, as shown in FIG. 9, sinker means 35 is widest at its curved base or sinker means lowermost surface 41. Surface 41 provides a stable platform upon which sinker means 35 and hook 25 will rest with the hook in the upright position shown in FIG. 6. When rigged as shown in FIG. 4 with a soft bodied lure, the lure will remain essentially in the horizontal position shown in FIG. 6 when it falls through the water toward the bottom, when sinker means 35 rests on the bottom, and when the lure is trolled or retrieved through the water toward the fisherman.

Shank 26 has a shank lowermost surface 24, and sinker means 35 protrudes or bulges rearwardly at 42 below or beyond surface 24 at the rear portion of the hook behind reverse bend 29. A relatively narrow ridge 43 extends vertically upwardly above base 41 and encloses part of the hook rear portion 34. The reverse bend 29 emerges from and extends above ridge 43. Creases 44 are defined on opposite sides of shank 26 where ridge 43 merges with the wider part of sinker means 35. Creases 44 are located essentially at or below shank 26. Shaping sinker means 35 generally like an isosceles triangle with the hook shank confined within narrow ridge 43, with the widest surface at base 41, and with the added weight at bulge 42 behind and below the hook shank results in at least half of the weight of the sinker means being located below the shank lowermost surface 24. This enables the lure to land and stay upright with the hook point in perfect position to impail fish, causes strike provoking movement as the lure sinks or is retrieved through the water, and makes the lure weedless in many situations.

Fishermen frequently cast a soft bodied fish lure into the water and wait motionless while the lure sinks to the bottom or descends to the depth at which the fisherman intends to retrieve the lure. Prior art riggings with weights ahead of the hook shank center of balance cause the soft bodied lures to nosedive or quickly fall head first with the rest of the lure extending vertically upwardly as it sinks. Fish seldom strike a lure having such an unnatural looking motion. Backweighted hooks with sinker means 10 and 35 entirely behind the center of balance of the hook cause the lure to sink essentially horizontally at a much slower rate of a descent. This gives the back-weighted soft bodied lure a natural appearance as it descends in the water and causes frequent strikes during the time the lure is descending. This enables fishermen to catch fish during a time period (i.e. as the lure sinks) that is wasted by prior art riggings. This results in more fish being caught during the time the fisherman spends on each fishing trip. Thus, the addition of a weight or sinker to a soft bodied lure in the manner disclosed herein makes it easier to cast the lure further and more accurately without destroying the natural looking fish attracting action of the lure.

When the back weight has a generally trianguler shape like sinker means 35 with its widest surface at base 41, this makes the front or eye end of the jig unstable and causes a soft bodied lure on the jig to wobble or tremble as it sinks or falls. This produces a swimming like natural motion that increases the lure's ability to provoke strikes. The wide base 41 and the fact that most of the weight of sinker means 35 is below the hook shank 26 keeps the hook and lure upright, as shown in FIG. 6, as it falls or is retrieved through the water, and when it rests on or is bumped along the bottom. Also, with a steady, gentle twitching retrieve, the embodiment of FIGS. 5-9 causes a soft bodied lure to swing about 180 degrees from side-to-side as it is pulled through the water; this make the soft bodied lure effective and easy to use by unskilled fishermen for catching suspended fish. The bulge or extra weight at 42 behind and below the hook shank lowermost surface 24 moves the center of balance of the hook as far away from eye 27 as is practical, and using this back-weighting techinque on the 60 degree jig hook 25 makes the lure weedless in situations where other soft bodied lure riggings are not. When floating strands of grass are encountered, such as when fishing salt water flats, other types of lures and riggings pick up the grass. However, jig hook 25 with triangular sinker means 35 presents a very narrow or slippery profile that causes floating grass to bounce or slide off of the lure when it is twitched. Also, the extra weight at 42 behind and below the hook shank tends to cause the prow and keel created by short shank segment 23 to ride or bounce upwardly when it encounters floating grass or weeds, thus making it less likely that floating debris will become attached to the lure. Prior riggings with the weight ahead of their center of balance tend to plow into the weeds or to bounce downwardly, and this almost insures that the lure will snag the weeds or grass.

While the invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A fish lure comprising:
   A. a soft lure body that is easily penetrated by a fish hook;
   B. a fish hook with a shank having an eye at a shank first end and a reverse bend at a shank second end, said shank having a central portion connecting said shank first end to said shank second end, said reverse bend terminating in a hook point, said hook having on said central portion a center of balance upon which said hook can be balanced on a knife edge, said center of balance dividing said hook into a front portion that includes said shank first end and a rear portion that includes said shank second end;
   C. means for attaching a first end of said soft lure body to said hook adjacent to said eye;
   D. sinker means immovable secured to said shank, said sinker means having a sinker means first terminal end facing said eye and a sinker means second terminal end adjacent said shank second end, said sinker means being located entirely at said rear portion of said hook, said sinker means first terminal end being adjacent said center of balance of said hook, but no part of said sinker means extending past said center of balance toward said shank first end, said point of said hook overlapping said sinker means and extending toward said eye, said sinker means when viewed in plan being generally elongated isosceles triangle shaped having its unequal side adjacent said shank second end and its equal sides having their vertex adjacent said center of balance, said unequal side being substantially shorter than said equal sides, said sinker means having a sinker means lowermost surface and when said sinker means is viewed transversely to said shank, said sinker means is widest at said sinker means lowermost surface, said sinker means lowermost surface defining a base upon which said sinker means is stable, said shank having a shank lowermost surface, said sinker means protruding beyond said shank lowermost surface at said rear portion of said hook, said sinker means having a relatively narrow vertically extending ridge that protrudes upwardly above said base and defines creases on opposite sides of said shank, said ridge enclosing part of said hook rear portion, said reverse bend of said shank emerging upwardly through said ridge, said ridge bulging rearwardly behind said reverse bend, at least half of the weight of said sinker means being located below said shank lowermost surface, and said sinker means being located entirely below said lure body.

2. A fish hook comprising:
   A. a hook shank having an eye at a shank first end and a reverse bend at a shank second end, said shank having a central portion connecting said shank first end to said shank second end, said reverse bend terminating in a hook point, and said shank having a shank lowermost surface; and
   B. sinker means immovable secured to said shank, said sinker means having a sinker means first terminal end facing said eye and a sinker means second terminal end adjacent said shank second end, said hook point overlapping said sinker means, said sinker means, when viewed in plan, being generally elongated isosceles triangle shaped having its unequal side adjacent said shank second end and its equal sides having their vertex at said sinker means first terminal end, said unequal side being substantially shorter than said equal sides, said sinker means having a sinker means lowermost surface and when said sinker means is viewed transversely to said shank, said sinker means being widest at said sinker means lowermost surface, said sinker means lowermost surface defining a base upon which said sinker means is stable, said sinker means having a relatively narrow vertically extending ridge that protrudes upwardly above said base, said ridge enclosing said shank second end, said reverse bend of said shank emerging upwardly through said ridge, and at least half of the weight of said sinker means being located below said shank lowermost surface.

3. The invention devined in claim 2, wherein said sinker means protrudes beyond said shank lowermost surface at said shank second end.

4. The invention defined in claim 2, wherein said ridge bulges rearwardly behind said reverse bend.

5. The invention defined in claim 2, wherein said central portion is straight and said front portion of said hook has a short shank segment that extends at an acute angle to the straight central portion.

6. The invention defined in claim 5 wherein said angle is about 60 degrees.

7. The invention defined in claim 2, further comprising means for attaching a soft lure body having a first end to said hook adjacent said eye comprising connector means having a connector means first end pivotally attached to said eye, and a connector means second end adapted to be connected to said soft lure body first end.

8. The invention defined in in claim 7 wherein said connector means comprises a helical wire coil having wire coil first end secured to said eye and a wire coil second end free for threading into said soft lure body first end.

9. A fish hook comprising:
A. a hook shank having an eye at a shank first end and a reverse bend at a shank second end, said shank having a central portion connecting said shank first end to said shank second end, said reverse bend terminating in a hook point, said hook having on said central portion a center of balance upon which said hook can be balanced, said center of balance dividing said hook into a front portion that includes said shank first end and a rear portion that includes said shank second end;
B. sinker means immovably secured to said shank, said sinker means having a sinker means first terminal end facing said eye and a sinker means second terminal end adjacent said shank second end, said sinker means being located entirely at said rear portion of said hook, said sinker means first terminal end being adjacent said center of balance of said hook, but no part of said sinker means extending past said center of balance toward said shank first end, said point of said hook overlapping said sinker means and extending toward said eye; and
C. said sinker means when viewed in plan having an outline that is generally only elongated isosceles triangle shaped having an unequal side adjacent said shank second end with a pair of equal sides having their vertex adjacent said center of balance, and said unequal side being substantially shorter than either of said equal sides.

10. The invention defined in claim 9, wherein said shank has a shank lowermost surface and at least half of the weight of said sinker means is located below said shank lowermost surface.

11. The invention defined in claim 9 wherein said sinker means weighs about one-half to four times the weight of said hook.

12. The invention defined in claim 9, wherein said sinker means has a relatively wide base and a relatively narrow vertically extending ridge that protrudes upwardly above said base, said ridge enclosing a part of said hook rear portion.

13. A fish hook comprising:
A. a hook shank having an eye at a shank first end and a reverse bend at a shank second end, said shank having a central portion connecting said shank first end to said shank second end, said reverse bend terminating in a hook point, said hook having on said central portion a center of balance upon which said hook can be balanced, said center of balance dividing said hook into a front portion that includes said shank first end and a rear portion that includes said shank second end;
B. sinker means immovably secured to said shank, said sinker means having a sinker means first terminal end facing said eye and a sinker means second terminal end adjacent said shank second end, said sinker means being located entirely at said rear portion of said hook, said sinker means first terminal end being adjacent said center of balance of said hook, but no part of said sinker means extending past said center of balance toward said shank first end, said point of said hook overlapping said sinker means and extending toward said eye; and
C. said sinker means when viewed in plan being generally elongated isosceles triangle shaped having its unequal side adjacent said shank second end with its equal sides having their vertex adjacent said center of balance, and said unequal side being substantially shorter than said equal sides, said sinker means having a sinker means lowermost surface, and when viewed transversely to said shank, said sinker means being widest at said sinker means lowermost surface, and said sinker means lowermost surface defining a base upon which said hook is stable.

14. The invention defined in claim 13, wherein said shank has a shank lowermost surface and said sinker means protrudes beyond said shank lowermost surface at said rear portion of said hook.

15. A fish hook comprising:
A. a hook shank having an eye at a shank first end and a reverse bend at a shank second end, said shank having a central portion connecting said shank first end to said shank second end, said reverse bend terminating in a hook point, said hook having on said central portion a center of balance upon which said hook can be balanced, said center of balance dividing said hook into a front portion that includes said shank first end and a rear portion that includes said shank second end;
B. sinker means immovably secured to said shank, said sinker means having a sinker means first terminal end facing said eye and a sinker means second terminal end adjacent said shank second end, said sinker means being located entirely at said rear portion of said hook, said sinker means first terminal end being adjacent said center of balance of said hook, but no part of said sinker means extending past said center of balance toward said shank first end, said point of said hook overlapping said sinker means and extending toward said eye; and
C. said sinker means having a sinker means lowermost surface, and when viewed transversely to said shank, said sinker means being widest at said sinker means lowermost surface, and said sinker means lowermost surface defining a base upon which said hook is stable, said sinker means having a relatively narrow vertically extending ridge that protrudes upwardly above said base, said ridge enclosing part of said hook rear portion, and said reverse bend of said shank emerging upwardly through said ridge.

16. The invention defined in claim 15, wherein said ridge bulges behind said reverse bend.

17. A fish hook comprising:
A. a hook shank having an eye at a shank first end and a reverse bend at a shank second end, said shank having a central portion connecting said shank first end to said shank second end, said reverse bend terminating in a hook point, said hook having on said central portion a center of balance upon which said hook can be balanced, said center of balance dividing said hook into a front portion that includes said shank first end and a rear portion that includes said shank second end;
B. sinker means immovably secured to said shank said sinker means having a sinker means first terminal end facing said eye and a sinker means second terminal end adjacent said shank second end, said sinker means being located entirely at said rear portion of said hook, said sinker means first terminal end being adjacent said center of balance of said hook, but no part of said sinker means extending past said center of balance toward said shank first end, said point of said hook overlapping said sinker means and extending toward said eye; and
C. said sinker means, when viewed in plan, being generally elongated isosceles triangle shaped having its unequal side adjacent said shank second end and its equal sides having their vertex adjacent said center of balance, said unequal side being substantially shorter than said equal sides, said sinker means having a sinker means lowermost surface and when said sinker means is viewed transversely to said shank, said sinker means being widest at said sinker means lowermost surface, said sinker means lowermost surface defining a base upon which said sinker means is stable, said shank having a shank lowermost surface, said sinker means protruding beyond said shank lowermost surface at said rear portion of said hook, said sinker means having a relatively narrow vertically extending ridge that protrudes upwardly above said base, said ridge enclosing part of said hook rear portion, said reverse bend of said shank emerging upwardly through said ridge, said ridge bulging rearwardly behind said reverse bend, and at least half of the weight of said sinker means being located below said shank lowermost surface.

18. The invention defined in claim 17, wherein said central portion is straight and said front portion of said hook has a short shank segment that extends at an angle of about 60 degrees to the straight portion.

19. A fish lure comprising:
A. a soft plastic lure body that is easily penetrated by a fish hook;
B. a backweighted fish hook having a shank with an eye at a shank first end and a reverse bend at a shank second end, said shank having a central portion connecting said shank first end to said shank second end, said reverse bend terminating in a hook point, said hook having on said central portion a center of balance upon which said hook can be balanced, said center of balance dividing said hook into a front portion that includes said shank first end and a rear portion that includes said shank second end;
C. means for attaching a first end of said soft plastic lure body to said hook adjacent said eye;
D. sinker means immovably secured to said shank, said sinker means having a sinker means first terminal end facing said eye and a sinker means second terminal end adjacent said shank second end, said sinker means being located entirely at said rear portion of said hook, said sinker means first terminal end being adjacent said center of balance of said hook, but no part of said sinker means extending past said center of balance toward said shank first end so as to backweight said hook, said point of said hook overlapping said sinker means and extending toward said eye, said point of said hook penetrating a portion of said lure body, and said sinker means being located entirely below said lure body; and
E. said shank having a shank lowermost surface and said sinker means having a sinker means lowermost surface, at least half of the weight of said sinker means being located below said shank lowermost surface and when viewed transversely to said shank said sinker means being widest at said sinker means lowermost surface so that said sinker means causes said backweighted hook and at least said portion of said lure body to sink in water essentially horizontally at a relatively slow rate of descent.

20. The invention defined in claim 19, wherein said sinker means when viewed in plan has an outline that is generally only elongated isosceles triangle shaped having an unequal side adjacent said shank second end with a pair of equal sides having their vertex adjacent said center of balance, and said unequal side is substantially shorter than either of said equal sides.

21. The invention defined in claim 19, wherein said sinker means has a relatively wide base and a relatively narrow vertically extending ridge that protrudes upwardly above said base, said ridge enclosing a part of said hook rear portion.

* * * * *